United States Patent [19]

Etoh

[11] Patent Number: 5,048,631
[45] Date of Patent: Sep. 17, 1991

[54] SYSTEM AND METHOD FOR AUTOMATICALLY CONTROLLING VEHICLE SPEED TO CRUISE SPEED

[75] Inventor: Yoshiyuki Etoh, Kanagawa, Japan

[73] Assignee: Nissan Motor Company, Limited, Yokohama, Japan

[21] Appl. No.: 363,754

[22] Filed: Jun. 9, 1989

[30] Foreign Application Priority Data

Jun. 16, 1988 [JP] Japan .............................. 63-79636[U]

[51] Int. Cl.$^5$ .............................................. B60K 31/04
[52] U.S. Cl. ..................................... 180/179; 180/170; 364/426.04
[58] Field of Search ....................... 180/170, 178, 179; 364/426.04

[56] References Cited

U.S. PATENT DOCUMENTS 4,549,266 10/1985 Schneider et al. ............. 364/426.04
4,819,172 4/1989 Takeuchi et al. .................... 180/179

FOREIGN PATENT DOCUMENTS 3314800 10/1984 Fed. Rep. of Germany ...... 180/170
60-3123 1/1985 Japan .
61-166734 7/1986 Japan ................................. 180/178

Primary Examiner—Andres Kashnikow
Assistant Examiner—Eric Culbreth
Attorney, Agent, or Firm—Pennie & Edmonds

[57] ABSTRACT

A System and method for automatically controlling a vehicle speed to a desired cruise speed are disclosed in which a control unit determines whether a control mode is a steady state mode in which the vehicle cruises at a set target vehicle speed or a transient state in which the target vehicle speed is transiently changed on the basis of input data of the actual vehicle speed, set target vehicle speed, an actual opening angle of an engine throttle valve, and a target opening angle of an engine throttle valve determined on the basis of a running resistance of the vehicle. In the steady state mode, the control unit controls a throttle actuator so that the target opening angle of the throttle valve coincides with the actual vehicle speed and actual vehicle speed is matched with the target vehicle speed. In a transient mode in which the vehicle speed is set in an acceleration or in a deceleration, a power supply signal supplied to the throttle actuator is variably controlled and the variable control is continued until the actual opening angle is matched with the target opening angle of the throttle valve. Therefore, a smooth switching between the steady state mode and transient state mode can be achieved.

12 Claims, 4 Drawing Sheets

SYSTEM AND METHOD FOR AUTOMATICALLY CONTROLLING VEHICLE SPEED TO CRUISE SPEED

BACKGROUND OF THE INVENTION (1) Field of the Invention

The present invention relates generally to a system and method for automatically controlling a vehicle speed to a desired cruise speed.

(2) Background of the Art

A Japanese Utility Model Application First Publication Showa 60-3123 published on Jan. 11, 1985 exemplifies an automotive vehicle cruising speed controlling system and method.

A previously proposed vehicle automatic cruise control system of the Japanese Utility Model 60-3123 type is shown in FIG. 3.; As shown in FIG. 3, the prior art system includes a target vehicle speed setting block having a set switch which is turned on and off produces a target speed signal $V_s$ of the vehicle. A control unit receives the target vehicle speed signal $V_s$ and an actual vehicle speed V derived from an integrator 10. After a predetermined arithmetic operation processing, a power supply pulse $T_p$ is outputted. An opening angle $\theta$ of a throttle valve is changed in response to the power supply pulse $T_p$ outputted from the control unit. A torque $T_E$ corresponding to the opening angle $\theta$ of the throttle valve is outputted to an engine transmission. The transmission converts the torque and outputs a wheel torque $T_w$. A wheel force $F_w$ is outputted as $F_w = T_w/R$ from a wheel portion. It is noted that R denotes an effective tire radius.

A vehicle running resistance D is detected by a vehicle running resistance detecting means. The vehicle running resistance includes, e.g., rolling resistance of a tire wheel, air resistance, gradient resistance, and so forth. The running resistance D is subtracted from the wheel force $F_w$ by means of a step S to determine a propelling force of the vehicle. A vehicle weight portion determines a vehicle acceleration V' with a total vehicle weight set as W. That is to say, $V' = (F_w - D)/W$. The acceleration V' is integrated by means of an integrator 10 to drive the actual vehicle speed V. The actual vehicle speed V is inputted to the control unit to constitute a closed loop.

In the above-described previously proposed system for controlling a vehicle speed to the desired cruise speed, the control unit receives the target vehicle speed $V_s$ and actual vehicle speed V and calculates the desired power supply pulse $T_p$. The power supply pulse $T_p$ is inputted into a throttle actuator to determine the opening angle of the throttle valve. The torque $T_E$ is transmitted to the transmission. The wheel torque $T_w$ is transmitted from the transmission to the wheel portion. The vehicle propelling force is derived through an arithmetic operation of the running resistance D and vehicle weight. The vehicle acceleration V' is derived at the vehicle weight portion. The acceleration V' is converted into the actual vehicle speed V by means of the integrator and is again inputted to the control unit. Hence, the opening angle of the throttle valve is properly adjusted by deriving the difference between the target vehicle speed $V_s$ and actual vehicle speed V.

However, there are problems in the above-described automatic cruise speed controlling system and method.

The control method executed by the control unit is divided into a steady state mode in which the actual vehicle speed V coincides with the target vehicle speed $V_s$ and in a transient mode in which the vehicle target speed $V_s$ which is changed transiently (increased or decreased) during the acceleration or deceleration of the vehicle is matched with the actual vehicle speed V.

At a time when the mode is switched, the opening angle $\theta$ of the throttle valve needs to be largely changed. Therefore, the switching between the steady state mode and transient state mode is not smoothly carried out due to variations in the characteristics of the throttle actuator and accelerator link.

The above-described switching is constituted by two system operations: (1) in order to accelerate or decelerate the vehicle, the mode is exchanged from the steady state operation mode to the transient operation mode; or (2) the mode is changed from the transient state operation mode to the steady state operation mode.

In the case of (1), the opening angle $\theta$ of the throttle valve is needed to increase step-wise toward $(\theta + \theta_1)$. In the case of (2), the opening angle $\theta$ of the throttle valve is needed to be reduced step-wise toward $(\theta - \theta_2)$. A pneumatic actuator constituted by bidirectional valves of a first valve (TIV) which actuates the throttle valve in the open direction and of a second valve (TDV) which actuates the throttle valve in the closed direction. In the above-described case (1), the power supply pulse $T_{p1}$ which is previously set for the first valve and which compensates for the change in the opening angle $\theta_1$ or of the throttle valve is needed to be outputted. Therefore, in a case where a deviation or a deterioration of an initial characteristic in the accelerator link or throttle actuator due to aging effect, for example, is present, the opening angle of the throttle valve is not smoothly adjusted by a change in the opening angle $\theta_1$ or $\theta_2$ outputted from the throttle actuator. Therefore, a predetermined acceleration cannot be achieved in the above-described case (1). The vehicle speed is changed due to unnecessary variation in the opening angle of the throttle valve in the case (2).

Consequently, the previously proposed automatic cruise speed controlling system can give an unpleasant feeling to a vehicle passenger(s) and/or driver.

SUMMARY OF THE INVENTION

It is, therefore, an object of the present invention to provide a system for automatically controlling a vehicle speed to a desired cruise speed which can facilitate a smooth change from the constant speed (steady state) mode to the transient operating mode and which will not generate unnecessary fluctuations in the opening angle of the throttle valve during the switch from the transient operating mode to the steady state mode and vice versa.

The above-described object can be achieved by providing a system for controlling a vehicle speed to a desired cruise speed, comprising: a) first means for detecting an actual vehicle speed; b) second means for setting a target vehicle speed; c) third means for detecting an actual operating variable of an engine driving force adjusting mechanism; d) fourth means for detecting an engine revolution speed; e) fifth means for deriving a running resistance of a vehicle in which the system is mounted on the basis of the vehicle speed, operating variable of the engine driving force adjusting mechanism, and engine revolution speed; f) sixth means for deriving a target operating variable on the basis of the running resistance; g) seventh means for determining whether the target operating variable is transiently changed; h) eighth means for outputting and varying a transient controlled variable until the actual operating variable coincides with the target operating variable when the target operating variable is transiently changed; i) ninth means for outputting a controlled variable so that the actual vehicle speed coincides with the target vehicle speed and the actual operating variable coincides with the target opening angle when the target operating variable is not transiently changed; and j) tenth means for adjusting the operating variable of the engine driving force adjusting mechanism on the basis of the controlled variables.

The above-described object can also be achieved by providing a system for automatically controlling a vehicle speed to a desired cruise speed, comprising: a) first means for detecting an actual vehicle speed; b) second means for setting a target vehicle speed; c) third means for detecting an actual opening angle of an engine throttle valve; d) fourth means for detecting an engine revolution speed; e) fifth means for deriving a running resistance of a vehicle in which the system is mounted on the basis of the actual vehicle speed, actual opening angle of the throttle valve, and engine revolution speed; f) sixth means for deriving a target opening angle of the throttle valve on the basis of the running resistance; g) seventh means for determining whether the mode of a control by the system is switched between a steady state mode and a transient state mode, or in the steady state mode, or in the transient state mode; on the basis of the actual vehicle speed, the target vehicle speed, the target opening angle of the throttle valve, and the actual opening angle of the throttle valve; h) eighth means for controlling a throttle actuator so that the actual opening angle of the throttle valve coincides with the target opening angle and the vehicle speed coincides with the target vehicle speed when the seventh means determines that the mode is in the steady state in which the vehicle cruises at the set target vehicle speed; and i) ninth means for variably controlling a pulsewidth of a power supply signal supplied to the throttle actuator so and continuing the variable control of the pulsewidth until the actual opening angle of the throttle valve coincides with the target opening angle actuator when the seventh means determines that the mode has been in the transient state.

The above-described object can also be achieved by providing a method for automatically controlling a vehicle speed to a desired cruise speed, comprising the steps of: a) detecting an actual vehicle speed; b) setting a target vehicle speed; c) detecting an actual operating variable of an engine driving force adjusting mechanism; d) detecting an engine revolution speed; e) deriving a running resistance of a vehicle in which the system is mounted on the basis of the vehicle speed, operating variable of the engine driving force adjusting mechanism, and engine revolution speed; f) deriving a target operating variable on the basis of the running resistance; g) determining whether the target operating variable is transiently changed; h) outputting and varying a transient controlled variable until the actual operating variable coincides with the target operating variable when the target operating variable is transiently changed; i) outputting a controlled variable so that the actual vehicle speed coincides with the target vehicle speed and the actual operating variable coincides with the target opening angle when the target operating variable is not transiently changed; and j) adjusting the operating variable of the engine driving force adjusting mechanism on the basis of the controlled variables.

DETAILED DESCRIPTION OF THE PREFERRED EMBODIMENT

Reference will hereinafter be made in order to facilitate a better understanding of the present invention.

Figure 1:
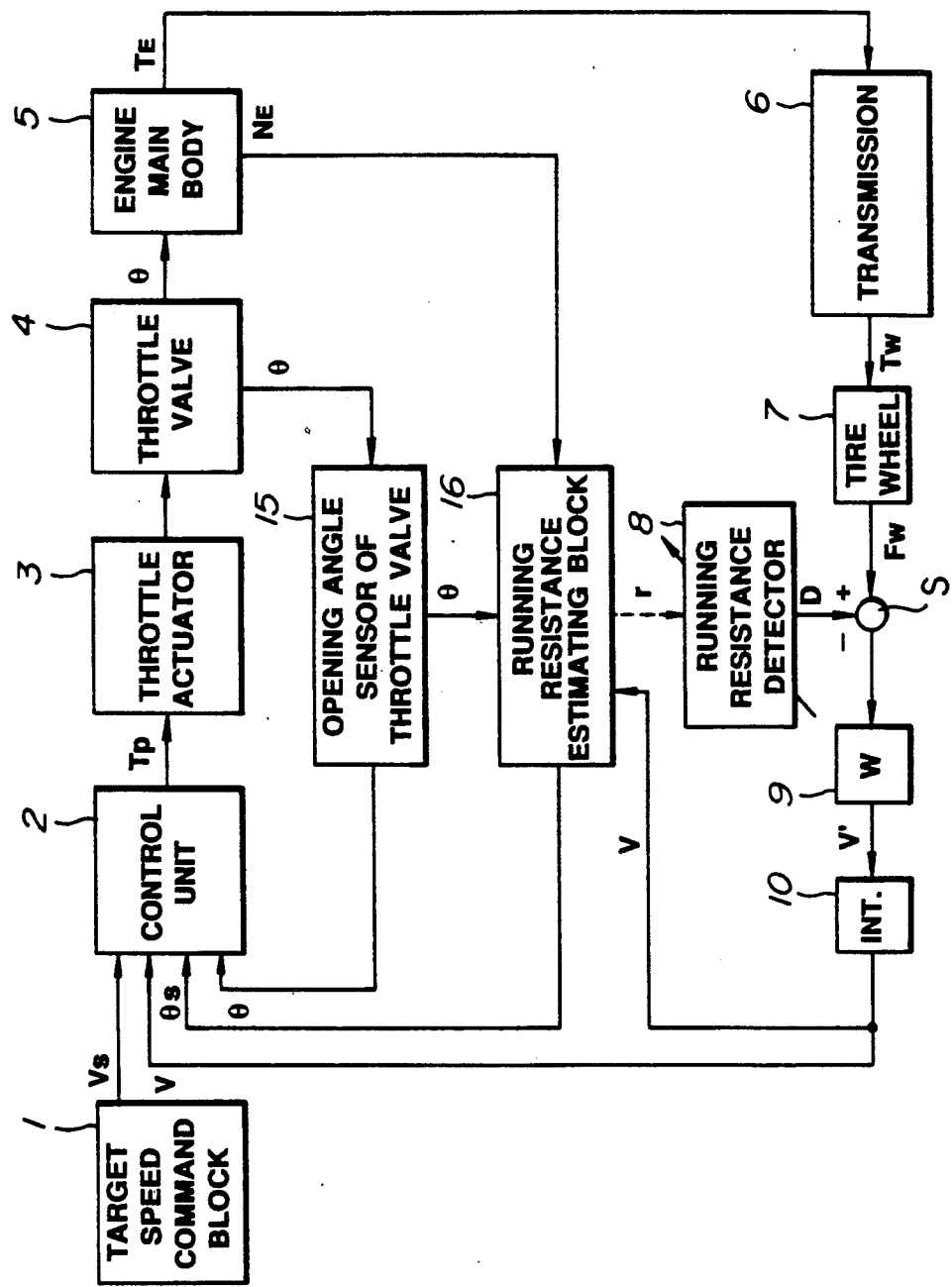
FIG. 1 is a circuit block diagram of a system for automatically controlling a vehicle speed to a desired cruise speed in a preferred embodiment according to the present invention.

FIG. 1 shows a preferred embodiment of a system for automatically controlling a vehicle speed to a desired cruise speed according to the present invention.

In FIG. 1, a target vehicle speed setting block 1 is constituted by a set switch, accelerate switch, resume switch. The target vehicle speed setting block 1 is exemplified by a U.S. patent application Ser. No. 169,218, filed on Mar. 16, 1988, the disclosure of which is hereby incorporated by reference.

The target vehicle speed setting block 1 outputs a target vehicle speed signal $V_s$.

A control unit 2 receives the target vehicle speed signal $V_s$, actual vehicle speed V derived from an integrator 10 as will be described later, a target opening angle $\theta_s$ derived from a running resistance estimating block 16 as will be described later, and an actual opening angle $\theta$ derived from an opening angle sensor 15. After a predetermined arithmetic operation, the control unit 2 outputs the power supply pulse $T_p$. A throttle actuator 3 drives a throttle valve 4 in response to the power supply pulse $T_p$ to determine an opening angle $\theta$ of the throttle valve 4. A structure of the throttle actuator 3 is exemplified by a U.S. patent application Ser. No. 169,218 filed on Mar. 16, 1988, the disclosure of which is hereby incorporated by reference. The throttle actuator 3 is constituted by a first valve (TIV) for actuating the throttle valve 4 in the open direction and a second valve (TDV) for actuating the throttle valve 4 in the close direction. A throttle valve opening angle sensor 15 is provided for detecting the actual opening angle 8 of the throttle valve. An engine main body 5 outputs a torque $T_E$ according to an opening angle $\theta$ of the throttle valve 4. A running resistance estimating block 16 receives an engine revolution speed $N_e$ from the engine main body (actually detected by a crank angle sensor), the actual vehicle speed V derived by the integrator 10, and actual opening angle $\theta$ of the throttle valve 4. The running resistance estimating block 16, after a predetermined arithmetic operation, calculates the target opening angle $\theta_s$ of the throttle valve 4 in order to maintain the vehicle at the desired speed. The target opening angle $\theta_s$ of the throttle valve 4 is transmitted to the control unit 2.

The running resistance estimating block 16 is exemplified by a U.S. patent application Ser. No. 057,086 filed on June 3, 1987 (now allowed), the disclosure of which is hereby incorporated by reference.

The torque $T_E$ derived from the engine main body 5 is converted by means of a transmission 6 and is outputted as a wheel torque $T_w$ from the transmission 6. A tire wheel portion 7 outputs a wheel force $F_w$ from the wheel torque $T_w$ from the transmission 6 in the following equation: $F_w = T_w/R$ (R denotes a tire effective radius). Running resistance detecting means 16 receives a rolling resistance of tire wheels, air resistance, gradient resistance, and output signal r of the running resistance estimating block 16 and derives the running resistance D of the vehicle. The running resistance D is subtracted from the wheel force $F_w$ by a substractor S to determine the propelling force of the vehicle. A vehicle weight portion 9 determines a vehicle acceleration V' with the total weight of the vehicle being W in the following equation: $V' = (F_w - D)/W$.

The acceleration V' is integrated by means of the integrator 10 to derive the actual vehicle speed V. The actual vehicle speed V is transmitted to the control unit 2 and running resistance estimating block 16.

The control unit 2 includes a microcomputer having a CPU, ROM, RAM, and I/O unit together with the running resistance detecting means 8 and running resistance estimating block 16. The control unit 2 includes means for operating in a steady state mode in which the actual vehicle speed V is matched with the target vehicle speed $V_s$ and means for operating in a transient state in which the vehicle speed V is matched with the target vehicle speed $V_s$ which increases or decreases transiently during the acceleration or deceleration.

As shown in FIG. 1, a closed loop is constituted in the automatic cruising speed controlling system.

Hence, since the control unit 2 receives the target vehicle speed $V_s$ set by a driver, the actual vehicle speed V, target opening angle $\theta_s$ of the throttle valve 4, and actual opening angle of the throttle valve 4, and outputs the calculated power supply pulse $T_p$ to the TIV and TDV of the throttle actuator 3 on the closed loop basis and the action of the two valves TIV and TDV causes the throttle valve 4 to properly be adjusted toward a properly determined opening angle, the vehicle can continuously run at a constant vehicle speed.

It is noted that the control unit 2 determines whether the command signal derived from the target vehicle speed setting block 1 is in the steady state mode or in the transient state mode. If the command signal indicates the steady state mode, the control unit 2 operates so that the target opening angle of the throttle valve $\theta_s$ is matched with an actual opening angle speed/$\theta$. When the switching between both modes occurs, the power supply pulse $T_p$ to the throttle actuator 3 from the control unit 2 is variably controlled until the actual opening angle $\theta$ coincides with the target opening angle $\theta_s$.

Figure 2A:
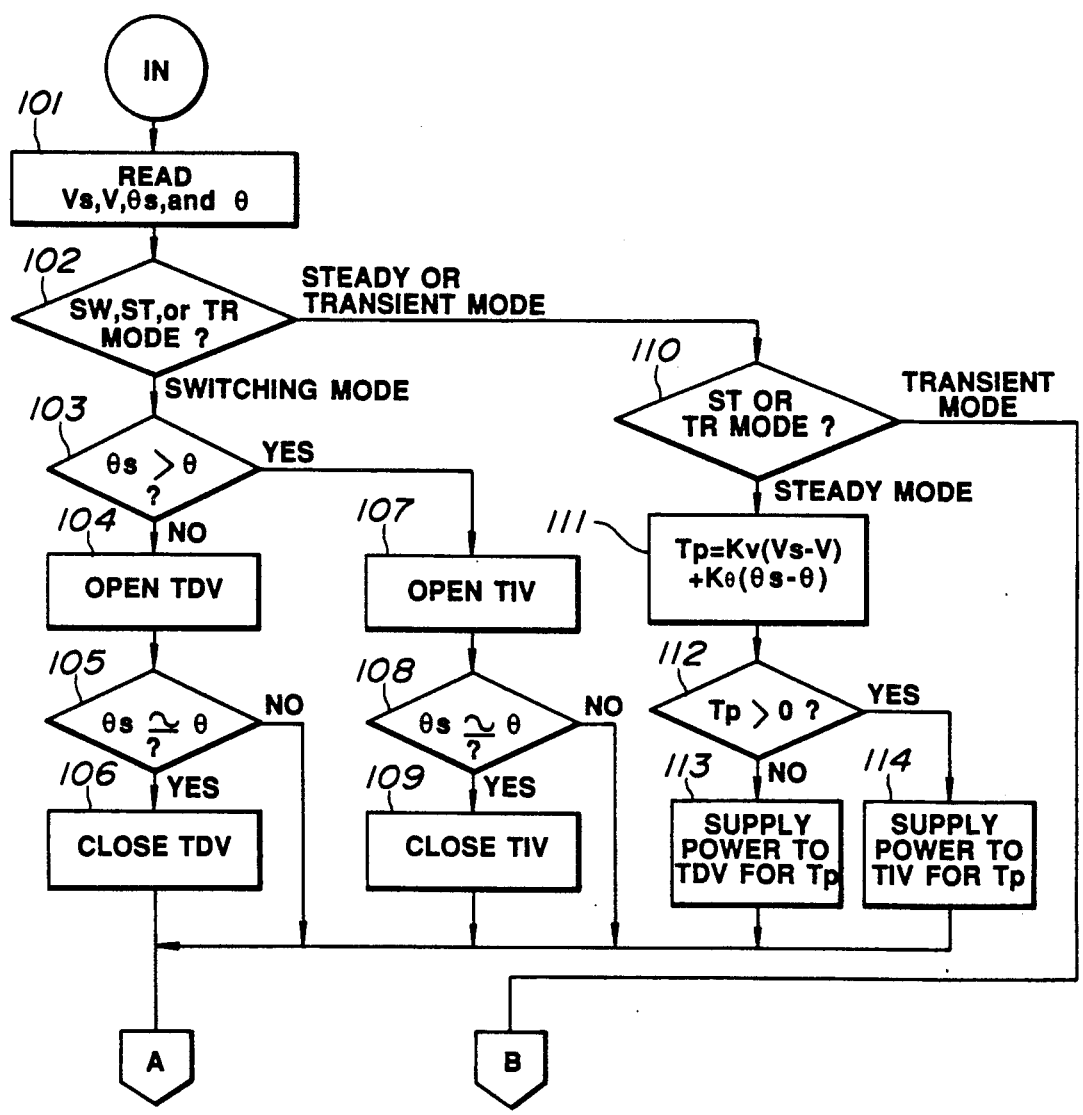
FIGS. 2 (A) and 2 (B) are integrally flowchart of a program for explaining an operation of the preferred embodiment shown in FIG. 1.
Figure 2B:
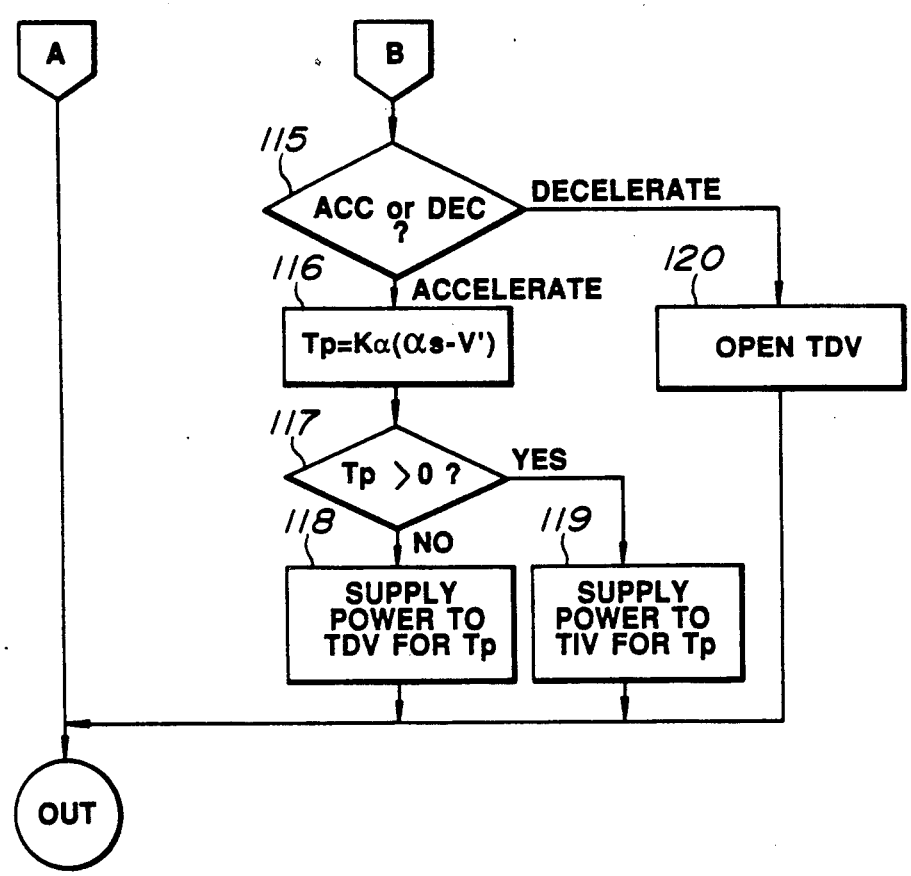
Figure 3:
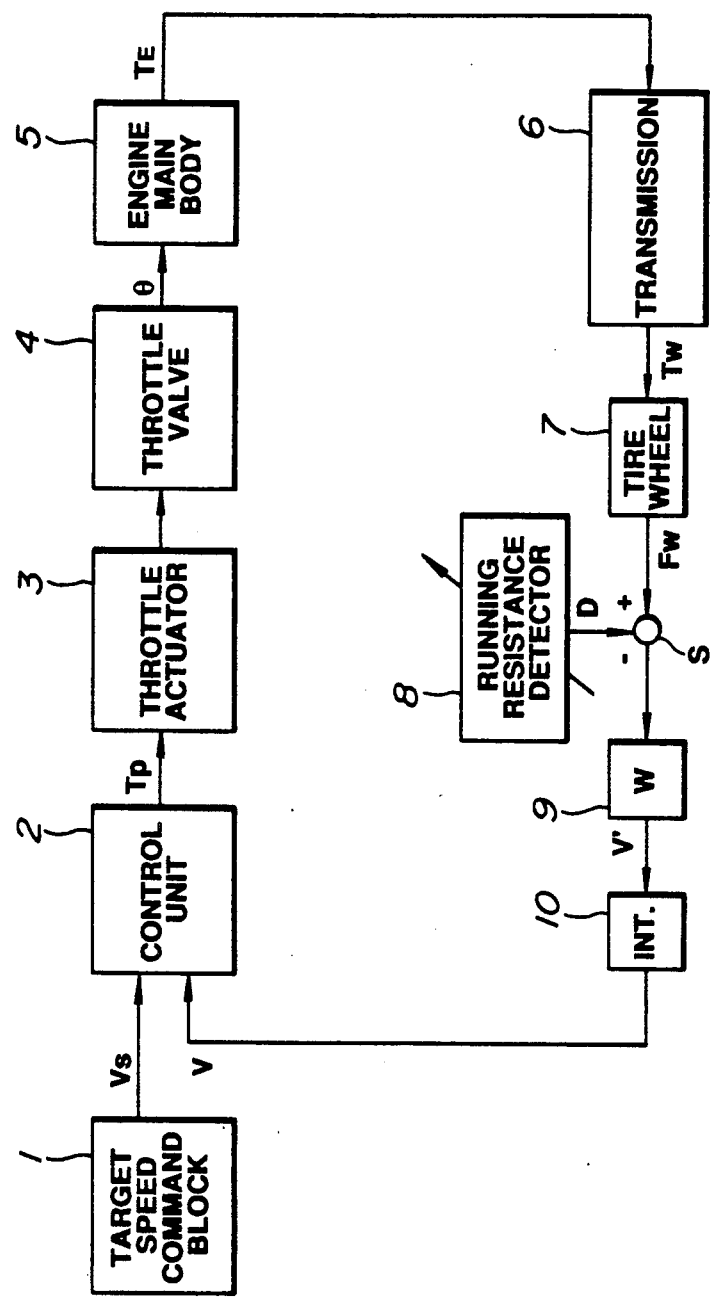
FIG. 3 is a block diagram of a prior art speed control system.

FIGS. 2 (A) and 2 (B) show an integral flowchart on which the control unit 2 executes the operation described above.

The flowchart shown in FIGS. 2 (A) and 2 (B) is executed for, e.g., 10 milliseconds.

In a step 101, the CPU of the control unit 2 reads the target vehicle speed $V_s$, actual vehicle speed V, target opening angle $\theta_s$ of the throttle valve 4, and actual opening angle $\theta$ of the throttle valve 4. In the next step 102, the CPU determines whether the control mode is in a switching mode of steady state to/from a transient state on the basis of the input data.

If the CPU determines that the control mode is in the switching mode, the routine goes to a step 103 in which the CPU determines whether the target opening angle $\theta_s$ is more than the actual opening angle $\theta$.

If $\theta_s > \theta$ (YES) in the step 103, the routine goes to a step 107. If $\theta_s \leq \theta$ (NO), the routine goes to a step 104.

In the step 104, the TDV of the throttle actuator 3 is opened. In the next step 105, the CPU determines whether the actual opening angle $\theta$ is substantially equal to the target opening angle $\theta_s$.

If $\theta_s \approx \theta$, the TDV of the throttle actuator 3 is closed. If $\theta_s \neq \theta$, the routine goes to an out and repeats the above-described steps 101, 102, 103, 104, 105, and 106.

On the other hand, in the step 107, the TIV of the throttle actuator 3 is opened and the routine goes to a step 108 in which the CPU determines whether $\theta_s \approx \theta$. If YES in the step 108, the routine goes to a step 109 in which the TIV is closed. If NO ($\theta_s \neq \theta$), the routine goes to the out and the routine repeats the above described steps.

Furthermore, if the control mode is in the steady or transient operating mode, the routine goes to a step 110 in which the CPU determines whether the present control mode is in the steady state mode or transient operating mode.

If in the steady state mode, the routine goes to a step 111 and if in the transient mode, the routine goes to a step 115.

In the step 111, the CPU calculates a pulsewidth of a power supply pulse $T_p$ to be transmitted to the throttle actuator 3 in the following equation: $T_p = K_v(V_s - V) + K_\theta(\theta_s - \theta)$, wherein Kv denotes a control constant of the vehicle speed and $K_\theta$ denotes a control constant of the opening angle of the throttle valve.

In a step 112, the CPU determines whether the calculated pulsewidth $T_p$ is more than zero (positive or negative). If $T_p$ indicates negative, the routine goes to a step 113 in which the CPU supplies the pulsewidth of $T_p$ to the TDV of the throttle actuator 3 for a duration of time $T_p$. If $T_p$ indicates positive, the routine goes to a step 114 in which the CPU supplies the power supply signal $T_p$ to the TIV for the duration of time $T_p$.

If the control mode indicates the transient state in the step 110, the routine goes to a step 115 in which the CPU determines whether the vehicle in an acceleration or deceleration.

If the vehicle is in the acceleration, the routine goes to a step 116. If the vehicle is in the deceleration, the routine goes to a step 116 in which the CPU calculates the following equation: $T_p = K_\alpha(\alpha_s - V')$, wherein $K_\alpha$ denotes a control constant of the vehicle acceleration, and $\alpha_s$ denotes a target acceleration.

If $T_p > 0$ (YES), the CPU supplies the power supply pulse signal $T_p$ to the TIV for the duration of time $T_p$ in a step 119.

If $T_p \leq 0$ (NO), the CPU supplies the power supply pulse signal $T_p$ to the TDV for the duration of time $T_p$ in a step 118.

If the vehicle is in the deceleration, the routine goes to a step 120 in which the CPU opens the TDV and the routine goes to the out.

In the steady state mode, the control unit 2 controls in such a way that the target opening angle $\theta_s$ of the throttle valve 4 is equal to the actual opening angle $\theta$. In the transient operating mode in which the vehicle speed is increased or decreased, the power supply pulse from the control unit to the throttle actuator is variably controlled until the actual opening angle $\theta$ coincides with the target opening angle $\theta_s$.

As described hereinabove, in the automatic cruise speed controlling system and method, the throttle valve target opening angle, the throttle valve actual opening angle, the actual vehicle speed, and target vehicle speed are derived, the steady state or transient operating state is determined on the basis of the above-described input data. In the steady state in which the vehicle cruises at the constant speed, the target vehicle speed of the vehicle is matched with the actual vehicle speed. In the transient mode in which the vehicle speed is switched in the acceleration mode or deceleration mode, the power supply pulse from the control unit to the throttle actuator is variably controlled so that the actual vehicle speed is matched with the target vehicle speed. The desired power supply pulse is calculated to determine the opening angle of the throttle valve via the throttle valve actuator. The torque according to the opening angle of the throttle valve is transmitted to the wheel portion of the vehicle via the transmission. Thus the cruise run of the vehicle is enabled.

The effect of enabling the smooth transfer to the transient mode is achieved. In addition, the smooth change of the throttle valve opening angle is achieved by an output of the power supply pulse signal derived from the control unit to the throttle actuator. Unnecessary variation of the opening angle of the throttle valve is not generated.

It will be appreciated by those skilled in the art that the foregoing description is made in terms of the preferred embodiment and various changes and modifications may be made without departing from the scope of the present invention which is to be defined by the appended claims.

What is claimed is:

1. A system for automatically controlling a vehicle speed to a desired cruise speed, comprising:
   a) vehicle speed detecting means for detecting the vehicle speed;
   b) setting means for setting a target vehicle speed;
   c) operating variable detecting means for detecting an actual operating variable of an engine driving force adjusting mechanism;
   d) means for detecting an engine revolution speed;
   e) running resistance deriving means for deriving a running resistance of a vehicle in which the system is mounted, on the basis of the vehicle speed, the operating variable of the engine driving force adjusting mechanism, and engine revolution speed;
   f) target variable deriving means for deriving a target opening variable of the engine deriving force adjusting mechanism on the basis of the running resistance;
   g) a determining means for determining whether the target vehicle speed is changed;
   h) a transient control variable generating means for outputting and varying a transient controlled variable of the engine driving force adjusting mechanism until the actual operating variable coincides with the target operating variable when target vehicle speed is changed;
   i) a steady state control variable generating means for outputting a controlled variable so that the actual vehicle speed coincides with the target vehicle speed and the actual operating variable coincide with the target operating variable when the target vehicle speed is not changed; and
   j) an adjusting means for adjusting the actual operating variable of the engine driving force adjusting mechanism no the basis of the steady state and transient controlled variables.

2. A system as set forth in claim 1, wherein said transient control variable generating means derives a pulsewidth of a power supply signal which is outputted to said adjusting means such that when the target operating variable is changed to a value greater than the actual operating variable, the pulsewidth causes the actual operating variable to be increased, and derives a pulsewidth of the power supply signal when the target operating variable is changed to a value lower than the actual operating variable which causes the actual operating variable to be decreased.

3. A system as set forth in claim 2, wherein said vehicle speed detecting means comprises an integrator and a vehicle weight incorporation portion, such that said means derives a vehicle speed change rate $V'$ according to an equation $V' = (F_w - D)/W$, wherein W denotes a total weight of the vehicle, $F_w$ denotes a wheel force which is expressed as $F_w = T_w/R$, with R denoting an effective radius of a tire of said vehicle and $T_w$ denoting a torque derived from a unit of said vehicle for transmitting an engine torque to a wheel of said vehicle, and D denotes a running resistance of said vehicle derived by said running resistance deriving means, the integrator deriving the actual vehicle speed form the vehicle speed change rate and outputting the actual vehicle speed to said running resistance deriving means, target variable deriving means, said determining means, and said transient control variable generating means.

4. A system as set forth in claim 3, wherein the operating variable of the engine driving force adjusting mechanism is an opening angle of an engine throttle valve.

5. A system for automatically controlling a vehicle speed to a desired cruise speed, comprising:
   a) vehicle speed detecting means for detecting an actual vehicle speed;
   b) a setting means for setting a target vehicle speed;
   c) an operating variable detecting means for detecting an actual opening angle of an engine throttle valve;
   d) a means for detecting a n engine revolution speed;
   e) a resistance deriving means for deriving a running resistance of a vehicle in which the system is mounted on the basis of the actual vehicle speed, actual opening angle of the throttle valve, and engine revolution speed;
   f) a target variable detecting means for deriving a target opening angle of the throttle valve on the basis of the running resistance;
   g) a mode determining means for determining whether the mode of a control by the system is switched between a steady state mode and a transient state mode, or in the steady state mode, or int he transient state mode, on the basis of the actual vehicle speed, the target vehicle speed, the target opening angle of the throttle vale, and the actual opening angle of the throttle valve;
   h) a throttle actuator control means for controlling a throttle actuator so that the actual opening angle of the throttle valve coincides with the target opening angle and the vehicle speed coincides with the target vehicle speed when said mode determining means determines that the mode is int he steady state in which the vehicle cruises at the set target vehicle speed; and
   i) a pulsewidth control means for variably controlling a pulsewidth of a power supply signal supplied to the throttle actuator and continuing the variable control of the pulsewidth until the actual opening angle of the throttle vale coincides with the target opening angle actuator when said mode determining means determines that he mode has been in the transient state.

6. A system as set forth in claim 5, wherein the throttle actuator includes a first valve for decreasing the opening angle of the throttle valve in response to the power supply signal and a second valve for increasing the opening angle of the throttle valve in response to the power supply signal and which further includes a means for determining whether the target opening angle is wider than the actual opening angle. includes tenth means for determining whether the target opening angle is wider that the actual opening angle.

7. A system as set forth in claim 6, wherein the power supply signal is transmitted to the first valve when the mode is switched between the steady state mode and transient state mode and when the target opening angle is narrower than the actual opening angle until the target opening angle is substantially equal to the actual opening angle and the power supply signal is transmitted to the second valve until the target opening angle is substantially equal to the actual opening angle when the mode is switched between the steady state mode and transient state mode and in the transient state until the target opening angle is substantially equal to the actual opening angle.

8. A system as set forth in claim 7, wherein when said mode determining means determines that the mode is in the steady state mode, the pulsewidth of the power supply signal is calculated as follows: $T_p = K_v \times (V_s - V) + K_\theta(\theta_s - \theta)$, wherein $K_v$ denotes a control constant for the vehicle speed, $V_s$ denotes the target vehicle speed, $V$ denotes the actual vehicle speed, $K_\theta$ denotes a control constant for the opening angle, $\theta_s$ denotes the target opening angle and $\theta$ denotes the actual opening angle, the power supply signal being outputted to the first or second valve of the throttle actuator according to the result of determination of whether the value of $T_p$ indicates a positive or negative.

9. A system as set forth in claim 8, which further includes a means for determining whether the vehicle is accelerated or decelerated and wherein when said mode determining means determines that the mode is in the transient state mode in which the target vehicle speed is transiently changed mode is in the transient state mode and the vehicle is accelerated, the pulsewidth of the power supply signal is calculated as follows: $T_p = K_\alpha \times (\alpha_s - V')$, wherein $K_\alpha$ denotes as acceleration constant, $\alpha_s$ denotes a target acceleration, and $V'$ denotes an actual acceleration derived on the basis of the actual vehicle speed, and the pulsewidth of the power supply signal is supplied to the first or second valve according to a result of determination whether the value of $T_p$ indicates a positive or negative.

10. A system as set forth in claim 9, wherein when the vehicle is decelerated, the first valve is closed to decrease the opening angle of the throttle valve.

11. A method for automatically controlling a vehicle speed to a desired cruise speed, comprising the steps of:
a) detecting an actual vehicle speed;
b) setting a target vehicle speed;
c) detecting an actual operating variable of an engine driving force adjusting mechanism;
d) detecting an engine revolution speed;
e) deriving a running resistance of a vehicle in which the system is mounted on the basis of the vehicle speed, operating variable of the engine driving force adjusting mechanism, and engine revolution speed;
f) deriving a target operating variable on the basis of the running resistance;
g) determining whether the target operating variable is changed,
h) outputting and varying a transient controlled variable until the actual operating variable coincides with the target operating variable when the target operating variable is changed,
i) outputting a controlled variable so that the actual vehicle speed coincides with the target vehicle speed and the actual operating variable coincides with the target opening angle when the target operating variable is not changed; and
j) adjusting the operating variable of the engine driving force adjusting mechanism on the basis of the controlled variables.

12. A system for automatically controlling a vehicle speed to a desired cruise speed, comprising:
a) vehicle speed detecting means for detecting the vehicle speed;
b) setting means for setting a target vehicle speed;
c) operating variable detecting means for detecting an actual operating variable of an engine driving force adjusting mechanism;
d) means for detecting an engine revolution speed;
e) running resistance deriving means for deriving a running resistance of a vehicle in which the system is mounted, on the basis of the vehicle speed, the operating variable of the engine driving force adjusting mechanism, and engine revolution speed;
f) target variable deriving means for deriving a target operating variable of the engine deriving force adjusting mechanism on the basis of the running resistance;
g) determining means for determining whether the target vehicle speed is changed;
h) transient control variable generating means for outputting and varying, when said determining means determined a change in the target vehicle speed, a transient controlled variable of the engine driving force adjusting mechanism such that the difference between said transient controlled variable and said actual operating variable converges, in a monotonic manner, to zero;
i) a steady state control variable generating means for outputting a controlled variable so that he actual vehicle speed coincides with the target vehicle speed and the actual operating variable coincide with the target when the target vehicle speed is not changed; and
j) an adjusting means for adjusting the actual operating variable of the engine driving force adjusting mechanism on the basis of the steady state and transient controlled variables.

* * * * *